United States Patent
Reed

(10) Patent No.: US 10,087,887 B2
(45) Date of Patent: Oct. 2, 2018

(54) SYSTEM FOR THE RECOVERY, STORAGE AND UTILISATION OF ATMOSPHERIC GAS FOR USE AS A VEHICLE PROPELLANT

(75) Inventor: Jaime Simon Reed, Stevenage (GB)

(73) Assignee: AIRBUS DEFENCE AND SPACE LIMITED, Stevenage, Hertfordshire (GB)

( * ) Notice: Subject to any disclaimer, the term of this patent is extended or adjusted under 35 U.S.C. 154(b) by 594 days.

(21) Appl. No.: 13/876,547

(22) PCT Filed: Jul. 27, 2011

(86) PCT No.: PCT/IB2011/053343
§ 371 (c)(1),
(2), (4) Date: Mar. 28, 2013

(87) PCT Pub. No.: WO2012/042400
PCT Pub. Date: Apr. 5, 2012

(65) Prior Publication Data
US 2013/0192194 A1 Aug. 1, 2013

(30) Foreign Application Priority Data
Sep. 30, 2010 (GB) .................................. 1016413.5

(51) Int. Cl.
*B64G 1/10* (2006.01)
*F02K 7/00* (2006.01)
(Continued)

(52) U.S. Cl.
CPC .................. *F02K 7/00* (2013.01); *B64G 1/10* (2013.01); *B64G 1/40* (2013.01); *B64G 1/402* (2013.01);
(Continued)

(58) Field of Classification Search
CPC ...... F02K 9/42; F02K 9/44; F02K 9/72; F02K 9/74; B64G 1/10; B64G 1/105;
(Continued)

(56) References Cited

U.S. PATENT DOCUMENTS 3,756,024 A * 9/1973 Gay ........................ B64G 1/14
244/1 R
4,754,601 A 7/1988 Minovitch
(Continued)

FOREIGN PATENT DOCUMENTS

| RU | 2397924 C2 | 8/2010 | |
|---|---|---|---|
| WO | 2010/028409 A1 | 3/2010 | |
| WO | WO 2010028409 A1 * | 3/2010 | ............. A61B 18/02 |

OTHER PUBLICATIONS

International Search Report (PCT/ISA/210) issued on Dec. 21, 2011, by the WIPO Patent Office as the International Searching Authority for International Application No. PCT/IB2011/053343.
(Continued)

*Primary Examiner* — Craig Kim
(74) *Attorney, Agent, or Firm* — Buchanan Ingersoll & Rooney PC

(57) ABSTRACT

A system for the recovery and management of atmospheric gas is disclosed, such as for use as a vehicle propellant in a vehicle propulsion system. The system can include a compressor configured to compress atmospheric gas and first and second storage tanks configured to store liquefied atmospheric gas from the compressor. The second storage tank can have a heater operable to heat liquefied atmospheric gas therein to convert it to a high pressure gas. The second storage tank includes an outlet duct fluidly coupled to the first storage tank for supplying high pressure gas to the first storage tank.

31 Claims, 8 Drawing Sheets

(51) Int. Cl.
　　　*B64G 1/40*　　　(2006.01)
　　　*B64G 1/16*　　　(2006.01)
(52) U.S. Cl.
　　　CPC .............. *B64G 1/105* (2013.01); *B64G 1/16* (2013.01); *B64G 1/401* (2013.01); *B64G 2001/1064* (2013.01); *B64G 2001/1071* (2013.01)
(58) Field of Classification Search
　　　CPC ... B64G 1/16; B64G 1/14; B64G 1/40; B64G 1/401; B64G 1/402
　　　See application file for complete search history.

(56) References Cited

U.S. PATENT DOCUMENTS

| | | | | |
|---|---|---|---|---|
| 5,144,806 | A * | 9/1992 | Frenzel | F25J 1/0007 62/637 |
| 5,329,777 | A * | 7/1994 | Weltmer, Jr. | F17C 9/02 62/49.2 |
| 6,644,015 | B2 * | 11/2003 | McKinney | F02K 9/78 60/205 |
| 2002/0139902 | A1 * | 10/2002 | Valentian | B64G 1/401 244/171.1 |
| 2005/0126176 | A1 * | 6/2005 | Fletcher | F02C 6/16 60/772 |
| 2007/0022736 | A1 * | 2/2007 | Durling | F02B 1/12 60/39.821 |
| 2008/0209916 | A1 * | 9/2008 | White | F17C 5/02 62/48.1 |
| 2012/0227374 | A1 * | 9/2012 | Zegler | F02K 9/44 60/204 |
| 2012/0255312 | A1 * | 10/2012 | Rajaraman | F01K 21/04 62/6 |
| 2014/0260186 | A1 * | 9/2014 | Bahn | F02K 9/42 60/257 |

OTHER PUBLICATIONS

Written Opinion (PCT/ISA/237) issued on Dec. 21, 2011, by the WIPO Patent Office as the International Searching Authority for International Application No. PCT/IB2011/053343.

United Kingdom Search Report dated Jan. 25, 2011, issued by United Kingdom Patent Office in corresponding United Kingdom Application No. GB1016413.5, (1 page).

International Search Report dated Dec. 21, 2011, issued in international application PCT/IB2011/053343 (2 pages).

Yu, D-R. et al., "Preliminary Design Analysis of a Hopper Vehicle for Mars Mission", Proceedings of the Institution of Mechanical Engineers, Part G: Journal of Aerospace Engineering, pp. 283-291 (Mar. 1, 2010).

Shafirovich, E. et al., "Mars Hopper Versus Mars Rover", Acta Astronautica, vol. 59, No. 8-11, pp. 710-716, (Oct. 1, 2006) XP025076913.

Yu, D-R. et al., "A Carbon Dioxide Thermal Rocket That Utilizes an Indigenous Resource in Raw Form for Mars Exploration", Proceedings of the Institution of Mechanical Engineers, vol. 224, Part G: Journal of Aerospace Engineering, pp. 283-291 (Mar. 1, 2010) XP002664740.

Landis, G. et al., "Mars Rocket Vehicle Using in Situ Propellants", Journal of Spacecraft and Rockets, vol. 38, No. 5, pp. 730-735 (Sep. 1, 2001) XP001099735.

Bruckner, A. P. et al., "Mars in Situ Propellant Technology Demonstrator Mission", Journal of the British Interplanteary Society, vol. 48, No. 8, pp. 337-346 (Aug. 1, 1995) XP000516467.

Translation of Russian Official Action issued in corresponding Russian Patent Application No. 2013119970/11.

Translation of Russian Official Notification of examination results issued in corresponding Russian Patent Application No. 2013119970/11.

* cited by examiner

SYSTEM FOR THE RECOVERY, STORAGE AND UTILISATION OF ATMOSPHERIC GAS FOR USE AS A VEHICLE PROPELLANT

The present invention relates to a system for the recovery and subsequent storage and utilisation of atmospheric gas for use as a vehicle propellant and, in particular, such a system for use in the recovery of atmospheric $CO_2$ from the Martian atmosphere for use as a propellant in a Mars Explorer vehicle, a propulsion system including such a system, and a vehicle incorporating such a propulsion system.

Various forms of vehicles have been proposed and developed for the purpose of exploring the surface of Mars. One type of such a vehicle is a wheeled vehicle, known as a 'rover', which, once dropped off at a landing site, drives across the surface of the planet and stops intermittently to conduct scientific experiments. This type of vehicle has the advantage that it is powered by electric motors and the energy to propel the vehicle can be collected using solar panels mounted on the top of the vehicle. The disadvantage of this type of vehicle is that it is relatively slow and so by driving over the planet surface, can only explore a very small fraction of the planet's surface. Furthermore, the extreme surface topography of Mars, including mountains, ravines and large areas of boulders, makes much of the surface of Mars impassable for such a wheeled explorer vehicle.

Another type of vehicle that has been proposed for the exploration of Mars' surface is a flying vehicle known as a 'hopper'. This type of vehicle uses jet propulsion to take off from the planet surface and fly to another location on the planet surface in a large 'hop'. Such 'hops' can involve the craft flying distances of tens of kilometers across the planet surface and so this type of vehicle has the advantage of being able to travel much further than a wheeled vehicle can. It also has the advantage that in flying from one location to the next, it is not hindered by natural topological features such as those mentioned above. However, the 'hopper' vehicle has the drawback that to power the 'hop', propulsion fuel is required. If the fuel is to be taken with the craft from earth, the amount of fuel required for a useful Mars exploration mission involving multiple 'hops' would be very heavy and so transporting such a large amount of fuel from Earth would be extremely expensive. Alternatively, to keep the mission costs down, a smaller amount of fuel could be provided, but this would mean that the hopper vehicle would only be able to perform a small number of hops, significantly limiting the range of the vehicle and/or the useful duration of the exploratory mission.

It is therefore an object of the present invention to provide a system for generating a propellant for such a vehicle, and a propulsion system and a vehicle including such a system, that substantially alleviates or overcomes the problems mentioned above. More particularly, it is an object of the present invention to provide a system for recovering, storing and utilising ambient atmospheric gas as a propellant, and a propulsion system and a vehicle including such a system.

Accordingly, the present invention provides a system for the recovery and management of atmospheric gas for use as a vehicle propellant, comprising a compressor configured to draw in and compress atmospheric gas, first and second storage tanks configured to store liquefied atmospheric gas from the compressor, each storage having an inlet duct for the supply of liquefied atmospheric gas thereto, the inlet duct of the first storage tank being fluidly connected to the compressor, the second storage tank having a heater operable to heat liquefied atmospheric gas therein to convert it to a high pressure gas, wherein the second storage tank includes an outlet duct fluidly coupled to the first storage tank for supplying high pressure gas to the first storage tank and, a control valve in said outlet duct, and wherein the first storage tank includes an outlet duct for the flow of liquid out of the first storage tank under pressure provided by the gas from the second storage tank.

Preferably, the system further comprises a liquefaction heat exchanger disposed downstream of the compressor to liquefy compressed gas from the compressor.

The control valve in the outlet duct of the second storage tank preferably comprises a Joule-Thomson control valve.

A heat exchanger is preferably provided in the outlet duct of the second storage tank, downstream of the control valve.

The heater of the second storage tank is preferably an electrical heater, although the heater of the second storage tank may comprises a Radioisotope Heating Unit.

A preferred embodiment of the invention further comprises a plurality of compressors in series configured to draw in and compress atmospheric gas. Preferably three compressors are provided, and in a preferred embodiment, one of the compressors is a rotary compressor and one of the compressors is a piston compressor.

The inlet ducts of the first and second storage tanks are preferably independently controllable by respective supply valves.

The exit duct of the first tank preferably includes a valve to control the flow of fluid out of the first tank.

A preferred embodiment may comprise a third storage tank for storing liquefied atmospheric gas supplied from the compressor, said third storage tank having an inlet duct for the supply of liquefied atmospheric gas thereto.

The third storage tank may include a heater operable to heat liquefied atmospheric gas therein to convert it to a high pressure gas and, the inlet duct of the third storage tank may be independently controllable by a supply valve.

The inlet duct of the second and/or third storage tank may be fluidly connected to the compressor.

The inlet duct of the second and/or third storage tank may be fluidly coupled to an outlet duct from the first storage tank via a valve so that the second and/or third storage tank can be controllably filled from the first storage tank.

At least one of the storage tanks preferably comprises an overpressure valve configured to open when the pressure within the tank exceeds a predetermined value.

The present invention also provides a propulsion system for a flying planetary surface exploration vehicle comprising a main thruster unit and a plurality of reaction control thrusters, and a system for the recovery and management of atmospheric gas for use as a propellant as described above, wherein the outlet duct of the first storage tank is fluidly connected to the main thruster unit via a control valve to supply liquefied atmospheric gas from the first storage tank to the main thruster unit for use as a propellant fuel therein.

The main thruster unit may comprise an exhaust nozzle and a superheating unit configured to convert liquefied atmospheric gas supplied thereto to a superheated gas for discharge through the exhaust nozzle as a vehicle propellant to produce lifting thrust.

The superheating unit preferably includes a thermal capacitor for transfer of heat to liquefied atmospheric gas supplied thereto and, a heating means configured to heat the thermal capacitor.

The reaction control thrusters are preferably fluidly connected to the main thruster unit for the supply of high pressure gas to the reaction control thrusters for use as a propellant.

Alternatively, the reaction control thrusters may be fluidly connected to one of the second or third storage tanks for the supply of high pressure gas to the reaction control thrusters for use as a propellant.

Yet further, an outlet duct of the first storage tank may be fluidly coupled to a secondary superheating unit configured to convert liquefied atmospheric gas supplied thereto from the first storage tank, to a superheated gas, the secondary superheating unit being fluidly connected to the reaction control thrusters to supply high pressure gas to the reaction control thrusters for use as a propellant.

At least one of the storage tanks may comprise a liquid level sensor and a controller connected to said sensor, wherein the controller is configured to close the inlet supply valve of the or each storage tank when the liquid level sensor detects that the tank is filled to a pre-determined level with liquefied atmospheric gas.

The controller may also be configured to control the compressor to stop when the or each level sensor detects that the liquid level in the or each storage tank has reached the pre-determined level.

The second and/or the third storage tank may include a temperature sensor and/or a pressure sensor, and the system may include a controller connected to said sensor, wherein the controller may be configured to control the heater of the respective storage tank in dependence on the sensed temperature and/or pressure detected by the sensor(s).

The propulsion system may further include one or more vehicle attitude sensors and a controller connected to the or each attitude sensor and to the reaction control thrusters, configured to activate one or more or the reaction control thrusters in dependence on signals provided by the or each attitude sensor.

The controller may be coupled to a control valve associated with each reaction control thruster and may be configured to open the respective valve to allow high pressure gas to be discharged though the respective reaction control thruster in dependence on signals provided by the or each attitude sensor.

The present invention also provides a flight-capable vehicle for planetary surface exploration including a propulsion system as described above.

Preferred embodiments of the present invention will now be described, by way of example only, with reference to the accompanying drawings, in which:

FIG. 5b shows a schematic view of an alternative configuration of the propellant recovery and management system according to the fourth embodiment of the invention shown in FIG. 5a;

Figure 1:
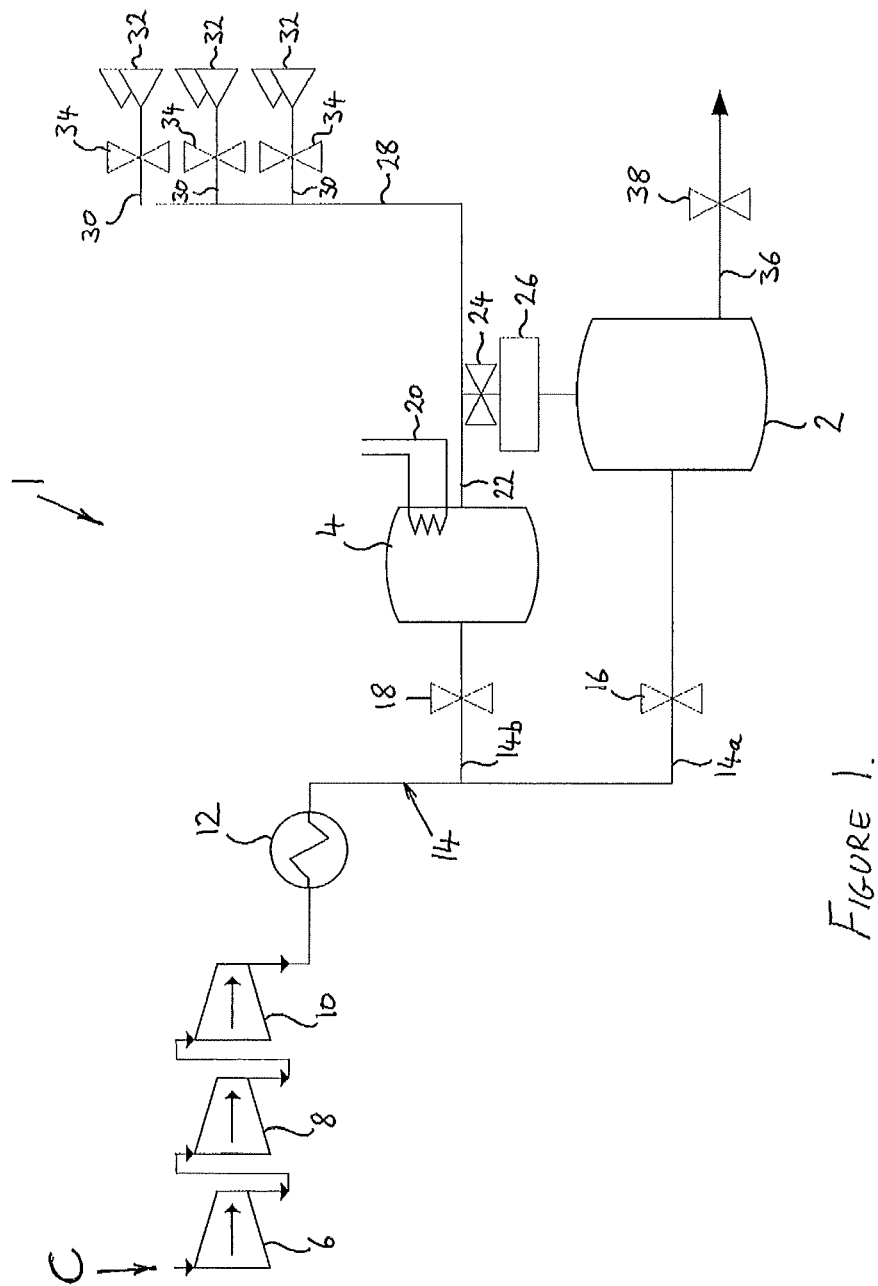
FIG. 1 shows a schematic view of a propellant recovery and management system according to a first embodiment of the invention.

Referring now to FIG. 1, a propellant recovery and management system 1 according to a first embodiment of the invention is shown, for use in a Mars 'hopper' exploration vehicle, and comprises a low pressure $CO_2$ storage tank 2 (hereafter referred to as 'LP tank') and a high pressure $CO_2$ storage tank 4 (hereafter referred to as 'HP tank'). A series of compressors 6,8,10 are provided and are configured to draw in and compress ambient atmospheric gas and supply it to a liquefaction heat exchanger 12 which cools the compressed atmospheric gas to a liquid. (The system of the invention is intended for use on Mars where the atmosphere is 95% $CO_2$ and so for the purposes of simplicity of description, 'atmospheric gas' will hereafter be described as $CO_2$, although it should be appreciated that the invention is not limited to use solely with such an atmospheric gas).

The liquefaction heat exchanger 12 is connected to the LP and HP tanks 2,4 by a supply duct 14. The supply duct 14 splits into two sections, a first section 14a feeds the liquefied $CO_2$ from the liquefaction heat exchanger 12 to the LP tank 2 and a second section 14b feeds the liquefied $CO_2$ to the HP tank 4. Each of the first and second supply duct sections 14a, 14b includes a respective valve 16, 18 operable to open or close the LP and HP tanks 2, 4, from the supply duct 14.

The HP tank 4 includes a heating means 20 operable to heat the contents of the HP tank 4. The HP tank also includes a feed pipe 22 leading out of the HP tank 4, through a 'Joule-Thomson' valve (or 'JT' valve) 24, through a heat exchanger 26 and into the top of the LP tank 2. The JT valve 24 is adjustable to control the flow of fluid therethrough.

An RCS ('Reaction Control System') supply pipe 28 splits off from the feed pipe 22 and subsequently divides further into individual supply lines 30, each of which leads to one of a plurality of thrusters 32 of a Reaction Control System. Each supply line 30 includes a control valve 34 to individually control the supply of $CO_2$ to the respective RCS thrusters 32.

A main thruster supply pipe 36 exits the bottom of the LP tank 2 and includes a control valve 38. The main thruster supply pipe 36 leads to a main 'hop' thruster 40 (not shown in FIG. 1, but illustrated schematically in FIG. 2 and explained below).

Figure 2:
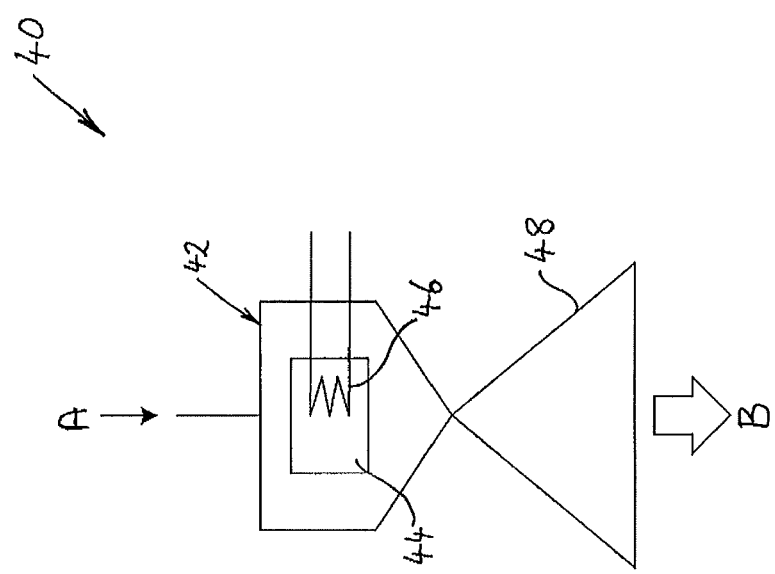
FIG. 2 shows a schematic view of a main hop thruster for use in a propulsion system and an explorer vehicle of an embodiment of the invention.

The main hop thruster system 40 is shown schematically in FIG. 2 and comprises the supply line 36 from the LP tank 2 which is connected to a superheating unit 42 for supplying liquid $CO_2$ thereto. The superheating unit 42 comprises a thermal capacitor 44 (for example, a mass of metal such as beryllium) and a heating means 46 configured to heat the thermal capacitor 44 to a high temperature. The heating means 46 may comprise any suitable means, such as an electrical heater or a Radioisotope Heating Unit (RHU). A thrust nozzle 48 is connected to the superheating unit 42 for the exhaust of $CO_2$ gas out of the main thruster unit 40. In use, the heating means 46 heats the thermal capacitor 44 to a high temperature and, upon opening of the control valve 38, liquid $CO_2$ is fed from the LP tank 2, through the supply line 36 and into the superheating unit 42 (see arrow 'A'). In the superheating unit 42, the liquid $CO_2$ contacts the thermal capacitor 44 and is instantly superheated to a gas which exits the superheating unit 42 as a jet from the nozzle 48 (see arrow 'B'), thereby producing thrust to launch a hopper vehicle from the surface of Mars.

Operation of the propellant recovery and management system 1 according to the first embodiment of the invention will now be described with reference to FIG. 1.

Firstly, the compressors 6,8,10 are operated to draw in and compress atmospheric $CO_2$ (see arrow 'C'). In the embodiment shown, a triple stage compressor system is illustrated, preferably comprising an initial rotary compressor 6, followed by two piston compressors 8, 10, although other configurations of compressor systems are intended to fall within the scope of the invention. The compressors, and indeed any electrically-powered component of the system 1 described hereafter, may be powered by electricity from solar panels (not shown) or from a battery (not shown) charged by solar panels, or alternatively, the electricity may be generated by a Radioisotope Thermoelectric Generator (RTG) (not shown). Solar panels have the advantage of providing free and limitless energy, but are hindered by the need to charge a battery over a period of time for use at night, whereas RTG has the advantage of higher power output and no restriction on day or night use. The atmospheric pressure of $CO_2$ drawn into the system 1 is at around 600 Pa, and exits the final compressor 10 at around 2 Mpa pressure.

The compressed $CO_2$ is then fed to the liquefaction heat exchanger 12 which cools the compressed $CO_2$ to around 200-260K and thereby liquefies the gaseous $CO_2$. Upon initial operation of the system 1, both of the tank valves 16, 18 are open and the JT valve 24 and RCS control valves 34 are closed. Therefore, the liquid $CO_2$ is fed though the supply duct 14 and then through both the first and second supply duct sections 14a, 14b to fill both the LP and HP tanks 2, 4 respectively with liquid $CO_2$. Once the smaller HP tank 4 is full of liquid $CO_2$ (which can be detected by a suitable level sensor—not shown), the valve 18 for the HP tank 4 is closed to prevent further supply of liquid $CO_2$ thereto and the system continues to fill the larger LP tank 2 with liquid $CO_2$. Once the LP tank is full of liquid $CO_2$ (which can also be detected by a suitable level sensor—not shown), the valve 16 for the LP tank 2 is closed to prevent further supply of liquid $CO_2$ thereto.

Following the above process, the propellant recovery and management system 1 is then fully charged with liquid $CO_2$ and ready to initiate a vehicle launch operation, as described hereafter. The heating means 20 is activated to heat the HP tank 4 and thereby heat the liquid $CO_2$ contained therein. This causes the $CO_2$ to turn into a gas within the HP tank 4, raising the pressure therein from around 2 MPa to around 7 MPa. In parallel, the heating means 46 begins to heat the thermal capacitor 44 in the superheating unit 42 of the main thruster system 40.

Thereafter, the JT valve 24 is opened to allow the high pressure $CO_2$ gas to enter the LP tank 2 through the heat exchanger 26. As the $CO_2$ gas passes through the insulated JT valve 24, it expands and therefore cools, and the heat exchanger 26 ensures the high pressure $CO_2$ gas remains cool to reduce the heat load on the LP tank 2 as the high pressure $CO_2$ passes into the LP tank 2. That is, if the high pressure $CO_2$ gas entering the LP tank 2 was hot, it could heat the liquid $CO_2$ already within the LP tank 2 and cause it to gassify which is not desirable. Once the JT valve 24 is open and the high pressure $CO_2$ gas from the HP tank 4 is supplied thereto, gravity causes the high pressure $CO_2$ gas to remain at the top of the LP tank 2 and the liquid $CO_2$ to remain at the bottom portion of the LP tank 2, with the high pressure $CO_2$ gas exerting high pressure on the liquid $CO_2$. The control valve 38 is then opened and the liquid $CO_2$ is forced to flow out of the supply line 36 at the bottom of the LP tank 2 by the pressure exerted on the liquid $CO_2$ by the high pressure $CO_2$ gas supplied from the HP tank 4. The liquid $CO_2$ then flows through the supply line 36 to the main thruster 40 and creates the lifting thrust for the hopper vehicle as described above with reference to FIG. 2.

As the hopper vehicle takes off under the force of the main thruster 40, the orientation of the hopper vehicle is monitored by appropriate sensors (not shown), and a controller (not shown) actuates the RCS thrusters 32 to make any adjustments to the attitude of the hopper vehicle which may be required. The RCS thrusters 32 are operated by opening the respective RCS control valve 34 which allows high pressure $CO_2$ gas to be supplied directly from the HP tank 4, through the supply pipe 28 to the RCS thruster 32. This arrangement is particularly advantageous as there is no need for a separate heating unit to convert liquid $CO_2$ to gaseous $CO_2$ for the individual RCS thrusters, as the $CO_2$ supplied to the RCS thrusters 32 is already in a high pressure gaseous form from the HP tank 4 suitable for release directly though the RCS thrusters 32 for attitude control.

The above-described system provides the advantage that there is little or no reduction in pressure with which the liquid $CO_2$ is expelled from the LP tank 2 out of the supply line 36 because as the level of liquid $CO_2$ drops in the LP tank 2, the additional space in the LP tank 2 is filled with high pressure $CO_2$ from the HP tank 4 and so the pressure in the LP tank 2 is maintained at a constant level. This means that the flow of liquid $CO_2$ to the main thruster 40 is constant throughout the duration of the vehicle's 'hop' flight and so the thrust generated by the main thruster 40 during the hop is constant for a given control valve 38 opening (although the thrust can be controlled by throttling the control valve 38). This overcomes the problems that would be experienced in the absence of the HP tank 4 if the LP tank 2 was directly heated to create $CO_2$ gas to expel the liquid $CO_2$ at the bottom of the tank out of the supply line 36. In such an embodiment, as the level of liquid $CO_2$ in the LP tank 2 reduced, the resulting pressure of the gaseous $CO_2$ in the LP tank 2 would drop, resulting in a drop-off in the flow rate of liquid $CO_2$ to the main thruster 40 through the supply line 36 towards the end of the hop and so the power of the main thruster 40 of the hop vehicle would not be consistent throughout the 'hop' flight, making flight control more difficult and flight duration shorter.

Although not shown in FIG. 1, both the LP tank 2 and the HP tank 4 are preferably provided with thermal insulation to isolate them against ambient temperature fluctuations on Mars. Furthermore, the system 1 could preferably include a heat switch (not shown) connected to a temperature sensor, a heating means and/or a radiator (not shown) on each tank 2,4 in order to maintain the temperature of each tank at the optimum level—for example, to prevent the respective tank becoming too cool at night (to avoid liquid $CO_2$ stored therein solidifying) and becoming too hot during the day (to avoid the liquid $CO_2$ therein gasifying when not desired). In the case of the HP tank 4, such a heat switch and temperature sensor could be connected to the heating means 20.

As the system 1 comprises the storage and management of high-pressure gas, a safety over-pressure valve (not shown) would preferably be provided to prevent the risk of explosion should the pressure in any part of the system exceed a predetermined level. Such an over-pressure valve could be provided at the top of the HP tank 4 to vent excess high-pressure $CO_2$ gas from the system 1, as the heating of liquid $CO_2$ in the HP tank 4 as described above would present the most likely cause of excess gas pressure in the system 1.

Figure 3:
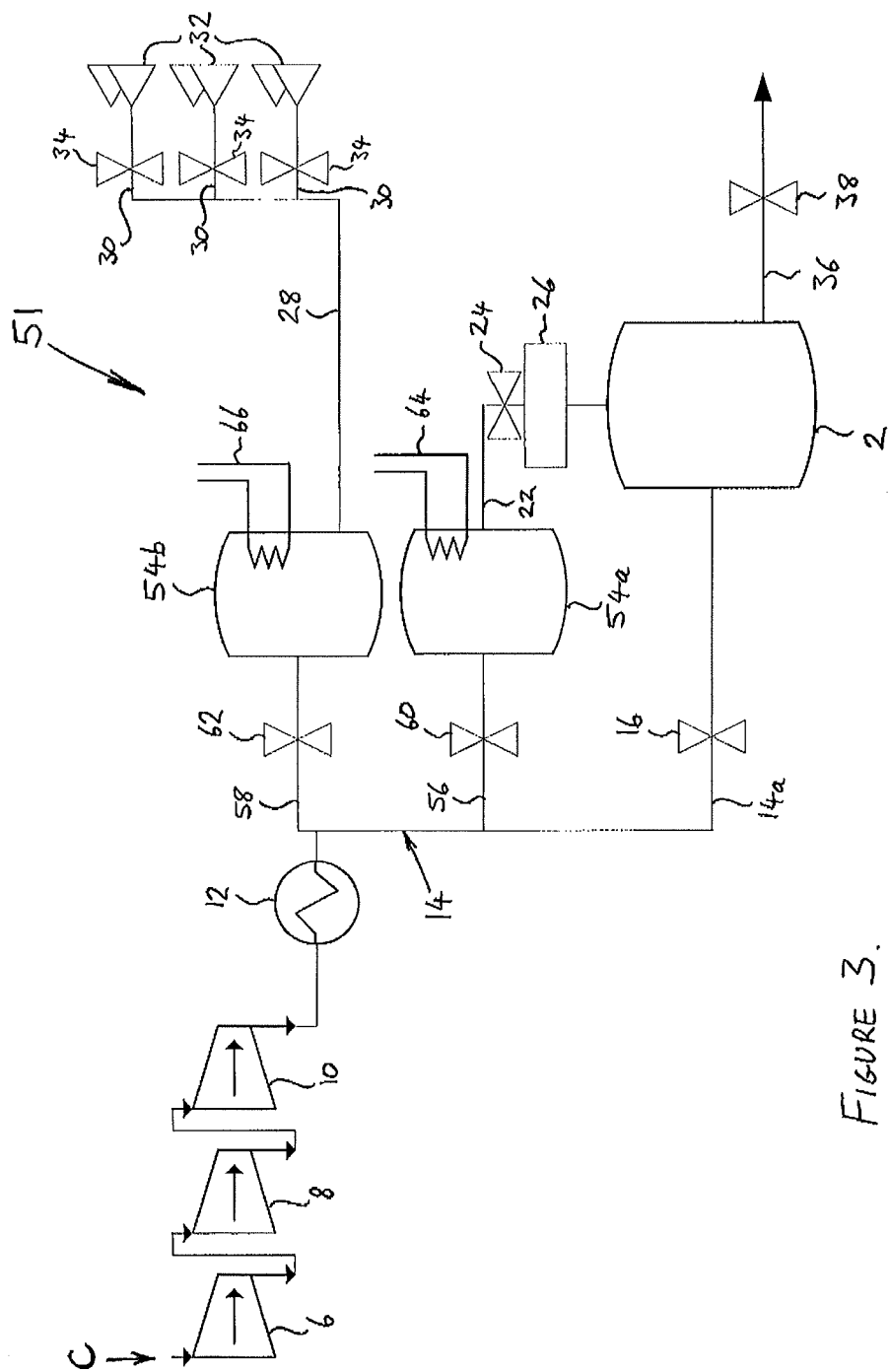
FIG. 3 shows a schematic view of a propellant recovery and management system according to a second embodiment of the invention.

A propellant recovery and management system 51 according to a second embodiment of the invention is shown in FIG. 3 and will be described hereafter. Features in common with the system 1 of the first embodiment of the invention shown in FIGS. 1 and 2 retain the same reference numerals. The system 51 differs from the system 1 of the first embodiment of the invention in that instead of one HP tank 4, two HP tanks 54a, 54b are provided. Each HP tank 54a, 54b is connected to the supply duct 14 by a respective inlet duct section 56, 58 via a respective valve 60, 62. Each HP tank 54a, 54b includes a respective heating means 64, 66 operable to heat the contents of the tank.

The first HP tank 54a is connected to the LP tank 2 by a feed pipe 22 via a JT valve 24 and a heat exchanger 26, as per the system of the first embodiment of the invention described previously. However, the first HP tank 54a is not connected to the RCS thrusters 32. Instead, only the second HP tank 54b is connected to the RCS thrusters 32 via a supply pipe 28 and individual supply lines 30 which split off from the supply pip 28, each of which leads to one of the RCS thrusters 32 via a control valve 34 to individually control the supply of $CO_2$ to the respective RCS thrusters 32. The second HP tank 54b is not connected to the LP tank 2.

Operation of the system 51 of the second embodiment of the invention will now be described with reference to FIG. 3, although steps identical to those already described above with reference to the system 1 of the first embodiment of the invention will not be described again, to avoid repetition.

The compressors 6,8,10 operate to draw in and compress atmospheric $CO_2$ (see arrow 'C') which is then fed to the liquefaction heat exchanger 12 which liquefies the gaseous $CO_2$ as described previously. Upon initial operation of the system 51, the LP tank valve 16 and the valves 60, 62 of both of the HP tanks 54a, 54b are open, and the JT valve 24 and RCS control valves 34 are closed. Therefore, the liquid $CO_2$ is fed though the supply duct 14 and then through both the first inlet duct section 14a to fill the LP tank 2 and through each of the HP tanks inlet duct sections 56, 58 to fill the HP tanks 54a, 54b respectively, with liquid $CO_2$. Once the smaller HP tanks 54a, 54b are full of liquid $CO_2$ (which can be detected by a suitable level sensor—not shown), the valves 60, 62 are closed to prevent further supply of liquid $CO_2$ thereto and the system continues to fill the larger LP tank 2 with liquid $CO_2$. Once the LP tank 2 is full of liquid $CO_2$ (which can also be detected by a suitable level sensor— not shown), the valve 16 for the LP tank 2 is closed to prevent further supply of liquid $CO_2$ thereto.

Once the system 51 is fully charged with liquid $CO_2$, a vehicle launch operation can be initiated by activating the heating means 64, 66 of both HP tanks 54a, 54b to heat the liquid $CO_2$ therein and turn it into a high pressure gas. In parallel, the heating means 46 begins to heat the thermal capacitor 44 in the superheating unit 42 of the main thruster 40.

Thereafter, the JT valve 24 is opened to allow the high pressure $CO_2$ gas from the first HP tank 54a to enter the LP tank 2 through the heat exchanger 26 and exert high pressure on the liquid $CO_2$ therein. The control valve 38 is then opened to allow liquid $CO_2$ to flow to the main thruster 40 as described previously.

As the hopper vehicle takes off under the force of the main thruster 40, any necessary attitude control is provided by the RCS thrusters 32 by opening the respective RCS control valve 34. This allows high pressure $CO_2$ gas to be supplied directly from the second HP tank 54b, through the supply pipe 28 to the RCS thruster 32. As with the system 1 of the first embodiment of the invention, this is advantageous in that there is no need for a separate heating unit to convert liquid $CO_2$ to gaseous $CO_2$ for the individual RCS thrusters 32 as high pressure $CO_2$ gas is supplied to the RCS thrusters 32 directly from the second HP tank 54b.

It will be appreciated that in the system 51 of the second embodiment of the invention, the first HP tank 54a only provides high pressure $CO_2$ gas to the LP tank 2 to force liquid $CO_2$ out to the main thruster 40, and the second HP tank 54b only provides high pressure $CO_2$ gas for the RCS thrusters 32. Therefore, each HP tank 54a, 54b has a single specific purpose, meaning that each can be smaller than the single HP tank 4 required in the system 1 of the first embodiment of the invention, and each can be independently controlled depending on the system operational requirements of each tank and its specific function, regardless of the required function of the other of the HP tanks 54a, 54b.

Figure 4:
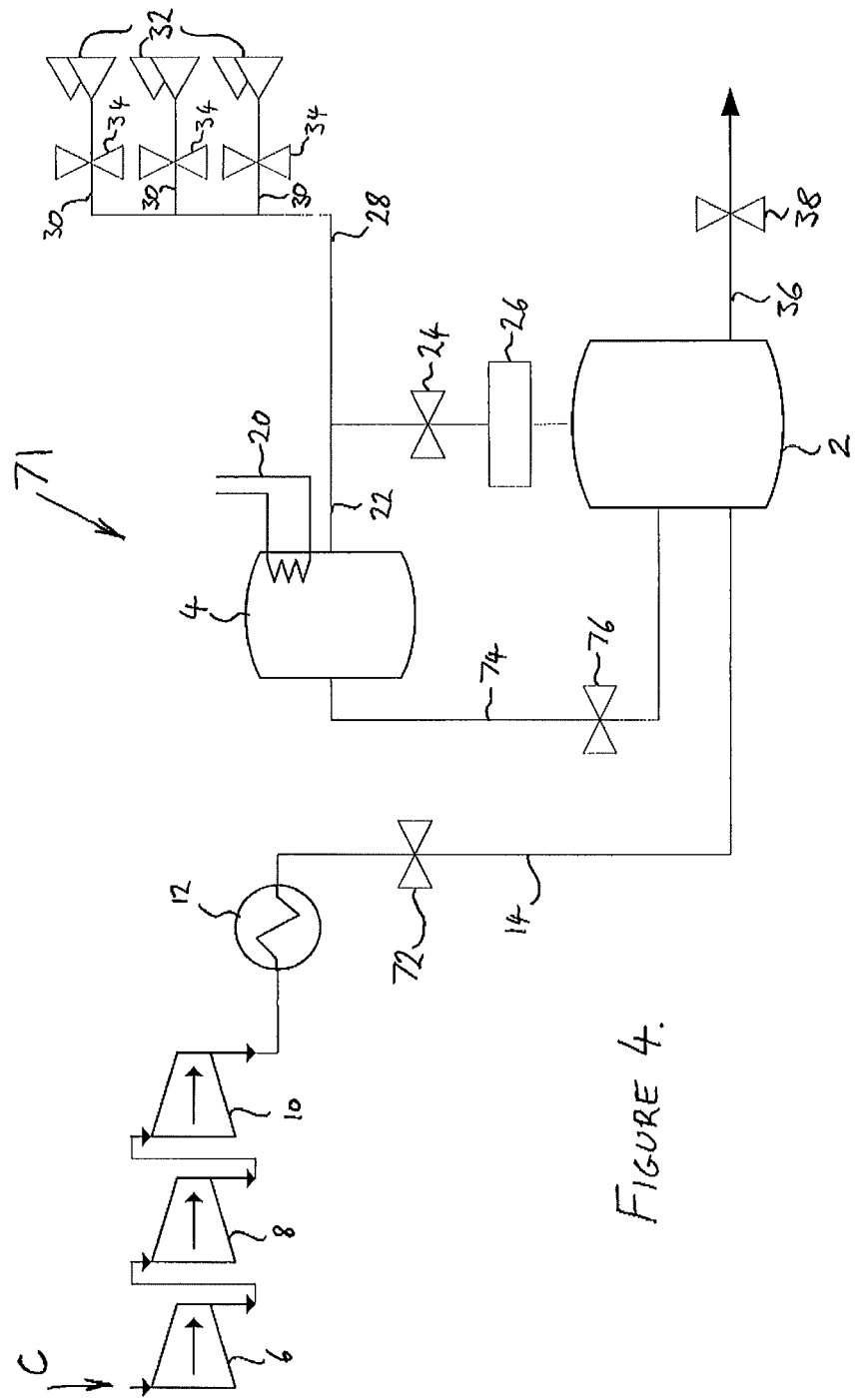
FIG. 4 shows a schematic view of a propellant recovery and management system according to a third embodiment of the invention.

A propellant recovery and management system 71 according to a third embodiment of the invention is shown in FIG. 4, in which features in common with the system 1 of the first embodiment of the invention shown in FIGS. 1 and 2 retain the same reference numerals. The system 71 differs from the system 1 of the first embodiment of the invention in that the supply duct 14 does not split into two sections 14a, 14b to respectively feed the LP and HP tanks 2, 4, but instead, the supply duct 14 leads only to the LP tank 2 via a single control valve 72. Furthermore, a siphon line 74 runs from the LP tank 2 to the HP tank 4 via a siphon valve 76.

In this alternative system configuration, only the LP tank 2 is filled with liquid $CO_2$ from the liquefaction heat exchanger 12 via the supply pipe 14 when the control valve 72 is opened. When the LP tank 2 is initially filled, the siphon valve 76 is open and liquid $CO_2$ is supplied though the siphon line 74 to the HP tank 4, thereby simultaneously filling the HP tank 4 with liquid $CO_2$. Once the HP tank 4 is full (which can be detected by a suitable sensor—not shown), the siphon valve 76 is closed and the LP tank 2 continues to be filled with liquid $CO_2$. Once the LP tank 2 is full of liquid $CO_2$, the control valve 72 is closed. Thereafter, operation of the system 71 is the same as described previously with reference to the system 1 of the first embodiment of the invention.

Figure 5A:
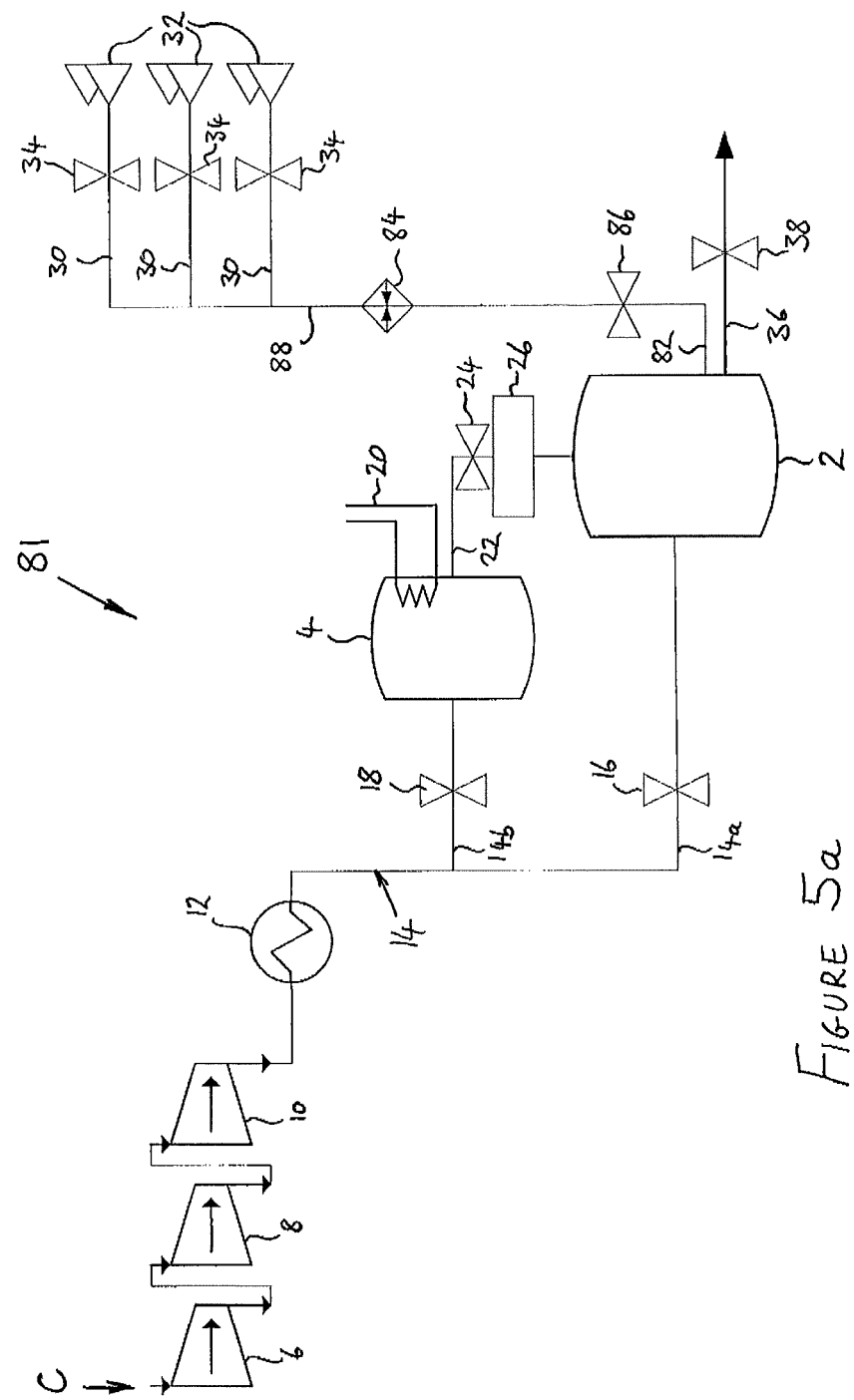
FIG. 5a shows a schematic view of a propellant recovery and management system according to a fourth embodiment of the invention.

A propellant recovery and management system 81 according to a fourth embodiment of the invention is shown in FIG. 5a, in which features in common with the system 1 of the first embodiment of the invention shown in FIGS. 1 and 2 retain the same reference numerals. The system 81 differs from the system 1 of the first embodiment of the invention in that the RCS supply pipe 28 which splits off from the feed pipe 22 exiting the HP tank 4 is omitted. Instead, an alternative RCS supply pipe 82 exits the LP tank 2 proximate its base, and extends to a second superheating unit 84 via a valve 86. An exit duct 88 extends from the superheating unit 84 to the individual supply lines 30, each of which leads to one of the RCS thrusters 32 via a control valve 34, as per the system 1 of the first embodiment of the invention.

In use, the LP and HP tanks 2, 4, of the system 81 are filled with liquid $CO_2$ as per the first embodiment of the invention. When a vehicle launch operation is to be initiated, the heating means 20 of the HP tank 4 is activated to heat the liquid $CO_2$ therein and turn it into a high pressure gas and, in parallel, the heating means 46 begins to heat the thermal capacitor 44 in the superheating unit 42 of the main thruster system 40. However, further to this, a heating means (not shown) in the second superheating unit 84 is also activated to heat a thermal capacitor (not shown) therein.

Thereafter, the JT valve 24 is opened to allow the high pressure $CO_2$ gas from the HP tank 4 to enter the LP tank 2 and exert high pressure on the liquid $CO_2$ therein, and the control valve 38 is then opened to allow liquid $CO_2$ to flow to the main thruster 40 to provide main launch thrust for the vehicle, as described previously.

However, as attitude control is required during the vehicle launch and flight, the valve 86 is opened to allow liquid $CO_2$ to flow from the LP tank 2 to the second superheating unit 84 where it is gassified, as in the superheating unit 42 of the main thruster unit 40. Thereafter, the respective RCS control valve 34 is opened to allow the superheated $CO_2$ gas to flow through the exit duct 88, through the supply line 30 and out through the RCS thruster 32. Therefore, in this embodiment of the invention, the HP tank 4 only provides gaseous $CO_2$ for the purpose of pressurising the LP tank 2 to force liquid $CO_2$ therein to flow to the main thruster 40 and to the RCS thruster 32, and the $CO_2$ gas to produce thrust in both the main and RCS thrusters 40, 32 is generated by a respective superheating unit 42, 84 gassifying liquid $CO_2$ supplied from the LP tank 2. However, the system 81 still provides the advantage described above that the flow of liquid $CO_2$ to the main thruster 40 (and also to the RCS thrusters 32) is constant throughout the duration of the vehicle's 'hop' flight.

Figure 5B:
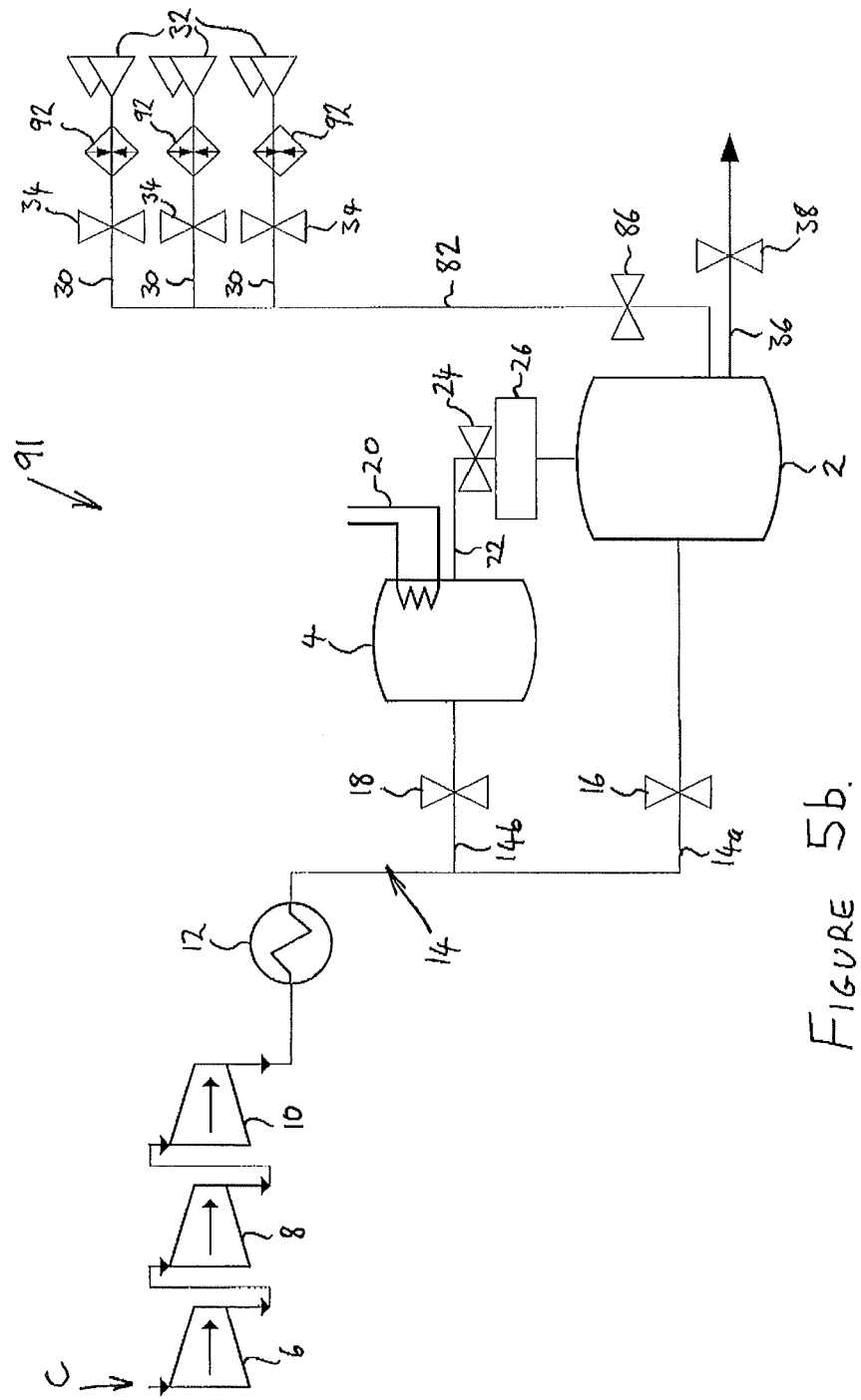

An alternative version of the propellant recovery and management system 91 of the fourth embodiment of the invention is shown in FIG. 5*b*, in which features in common with the system 81 of the first version shown in FIG. 5*a* retain the same reference numerals. The system 91 differs from the system 81 of the first version of the fourth embodiment of the invention in that the single second superheating unit 84 which supplies gassified $CO_2$ to all RCS thrusters 32 is omitted and instead, a plurality of secondary superheating units 92 are provided between each RCS valve 34 and the respective thruster 32. In use, the as attitude control is required during the vehicle launch and flight, the valve 86 is opened to allow liquid $CO_2$ to flow from the LP tank 2 through the exit duct 82 to the RCS control valves 34. Then, when a respective RCS control valve 34 is opened, liquid $CO_2$ flows to the respective superheating unit 92 which gassifies the liquid $CO_2$ which then exits the RCS thruster 32 to provide the necessary attitude control. Therefore, in this alternative of the fourth embodiment of the invention, the HP tank 4 only provides gaseous $CO_2$ for the purpose of pressurising the LP tank 2 to force liquid $CO_2$ therein to flow to the main thruster 40 and to the RCS thruster 32. The $CO_2$ gas to produce thrust in the main thruster 40 is produced as described previously. However, the $CO_2$ gas to produce thrust in the RCS thrusters is generated by individual superheating units 92 gassifying liquid $CO_2$ supplied from the LP tank 2, one superheating unit 92 associated with each individual RCS thruster 32. However, the system 91 still provides the advantage described above that the flow of liquid $CO_2$ to the main thruster 40 and to the RCS thrusters 32 is constant throughout the duration of the vehicle's 'hop' flight.

Figure 6:
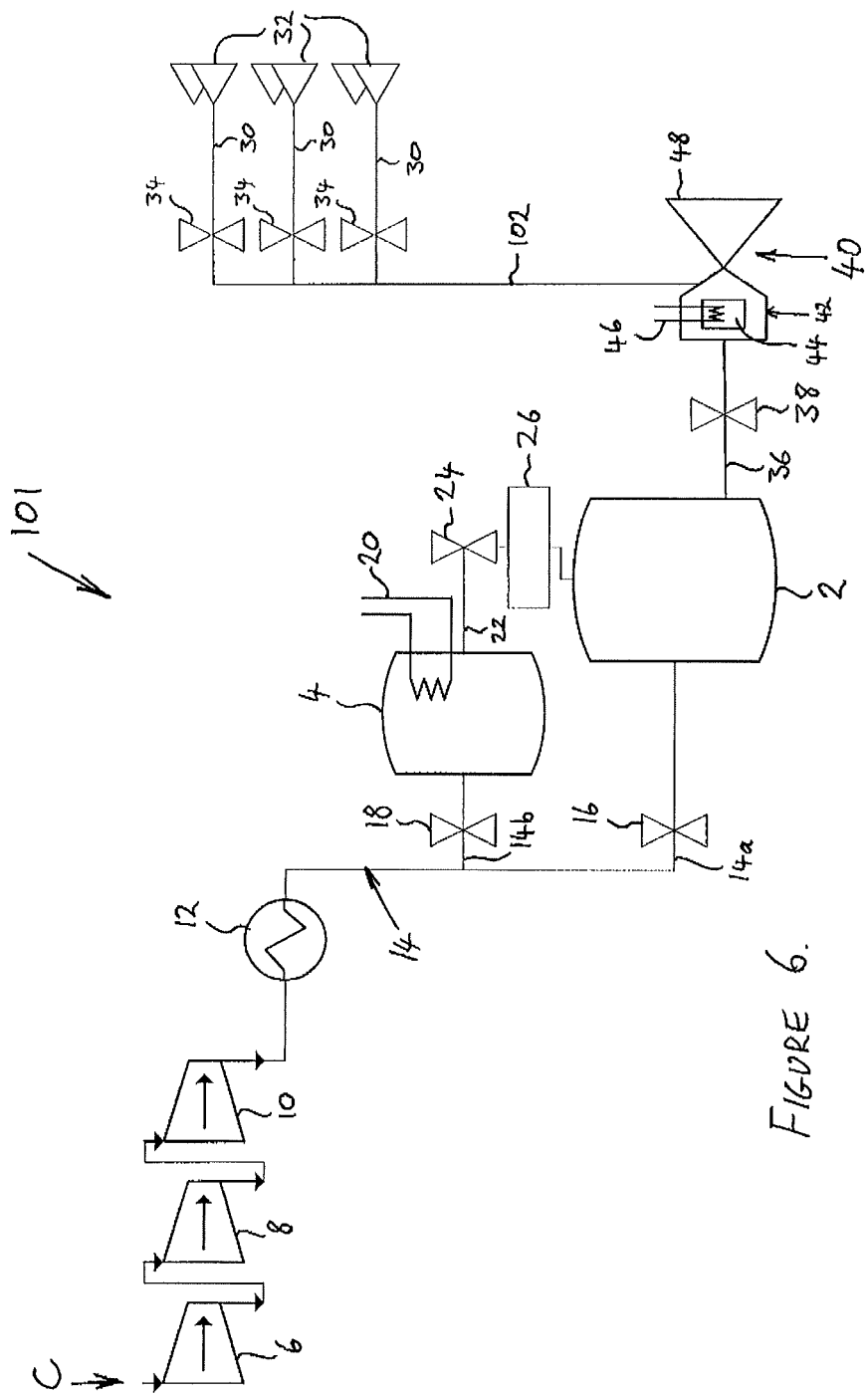
FIG. 6 shows a schematic view of a propellant recovery and management system according to the fifth embodiment of the invention.

A propellant recovery and management system 101 according to a fifth embodiment of the invention is shown in FIG. 6, in which features in common with the system 1 of the first embodiment of the invention shown in FIGS. 1 and 2 retain the same reference numerals. It will be noted that the system 101 shown in FIG. 6 also illustrates the main thruster 40 connected to the supply line 36 from the LP tank 2. The system 101 differs from the system 1 of the first embodiment of the invention in that the RCS supply pipe 28 which splits off from the feed pipe 22 is omitted and so the HP tank 4 only feeds gaseous $CO_2$ to the LP tank 2. The RCS system is fed with gaseous $CO_2$ from a RCS feed line 102 which extends from the superheating unit 42 of the main thruster 40 to each of the individual RCS supply lines 30.

In use, the system 101 is operated to fill the LP and HP tanks 2, 4 with liquid $CO_2$ as per the system 1 of the first embodiment of the invention described above. Similarly, in a launch procedure, the main thruster 40 is operated as per the system 1 of the first embodiment of the invention. However, when attitude control of the vehicle is required during launch/flight, the respective RCS control valve 34 is opened and high pressure $CO_2$ gas is fed from the superheating unit 42 of the main thruster 40 through the RCS feed line 102 to the respective RCS thruster 32.

Figure 7:
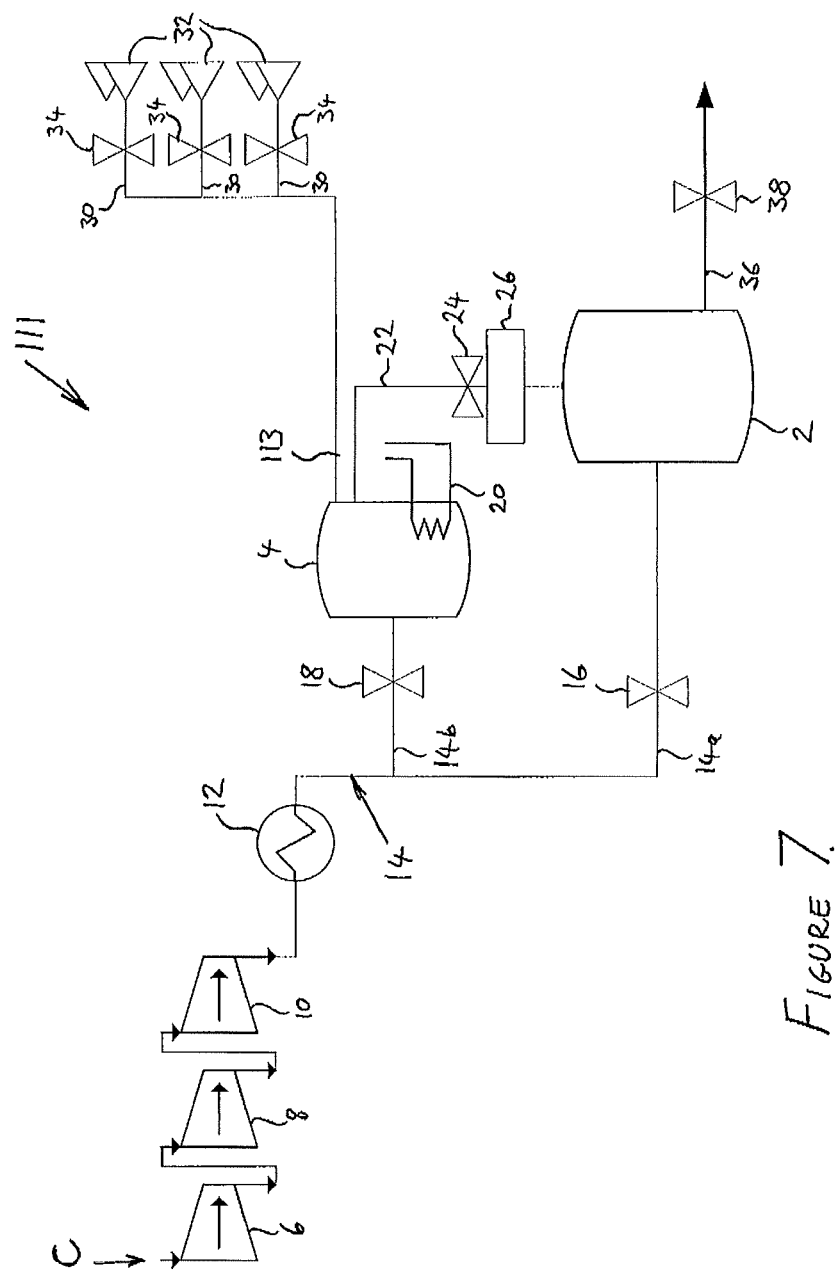
FIG. 7 shows a schematic view of a propellant recovery and management system according to a sixth embodiment of the invention.

A propellant recovery and management system 111 according to a sixth embodiment of the invention is shown in FIG. 7, in which features in common with the system 1 of the first embodiment of the invention shown in FIGS. 1 and 2 retain the same reference numerals. The system 111 differs from the system 1 of the first embodiment of the invention in that the RCS supply pipe 28 which splits off from the feed pipe 22 is omitted. Instead, a second outlet pipe 113 of the HP tank 4 is provided which extends to the RCS system. Therefore, the first outlet pipe of the HP tank 4, namely the feed pipe 22, feeds gaseous $CO_2$ to the LP tank 2, and the second, separate outlet pipe 113 feeds gaseous $CO_2$ to each of the individual RCS supply lines 30.

In use, the system 111 is operated to fill the LP and HP tanks 2, 4 with liquid $CO_2$ as per the system 1 of the first embodiment of the invention described above. Similarly, in a launch procedure, the main thruster 40 is operated as per the system 1 of the first embodiment of the invention. However, when attitude control of the vehicle is required during launch/flight, the respective RCS control valve 34 is opened and high pressure $CO_2$ gas is fed directly from the HP tank 4 through the second outlet pipe 113 to the respective RCS thruster 32, independently of the flow of $CO_2$ through the feed pipe 22.

It is intended that the feature of the sixth embodiment of the invention described above, in which the HP tank 4 includes two separate outlet pipes 22, 113 independently supplying gaseous $CO_2$ to the LP tank 2 and the RCS thrusters 32 respectively, could equally be applied to other embodiments of the invention described previously, for example, the third embodiment of the invention shown in FIG. 4.

It will be appreciated that all embodiments of the invention provide the advantages described above with reference to the first embodiment of the invention, that there is little or no reduction in pressure with which the liquid $CO_2$ is expelled from the LP tank 2 out of the supply line 36 because as the level of liquid $CO_2$ drops in the LP tank 2, the additional space in the LP tank 2 is filled with high pressure $CO_2$ from the HP tank 4/54*a*, thereby maintaining a consistent flow of liquid $CO_2$ to the main thruster 40 during the vehicle's 'hop' flight.

Although not shown in FIGS. 3-7, as with the first embodiment of the invention, the LP tank 2 and the HP tank 4/54*a* are preferably provided with thermal insulation to isolate them against ambient temperature fluctuations. Furthermore, for the reasons explained above, the systems 51, 71, 81, 91, 101, 111 could preferably include a heat switch (not shown) connected to a temperature sensor, a heating means and/or a radiator (not shown) on each tank 2, 4, 54*a*, 54*b*.

All embodiments of the invention are intended to include a control system (not shown) comprising one or more controllers operable to control the various functions of the components described above. For example, control of the compressors, tank inlet and outlet valves, main liquid $CO_2$ supply line valve 38 to the main thruster unit 40 and attitude control valves 34. Yet further, sensors (not shown) in the system could be connected to the or each controller such as tank fill level sensors to provide input for the compressors and inlet valve operation control, temperature and/or pressure sensors in the HP tanks for heater, RCS thruster system and JT valve operation control, and attitude sensors for RCS system operation control. Also, temperature sensors on all of the tanks connected to heat switches and heaters and/or radiators to ensure that the tank temperatures remain at optimum level, and do not become too cold at night or too hot during the day.

Although not shown in FIGS. 3-7, as with the first embodiment of the invention, a safety over-pressure valve (not shown) would preferably be provided to prevent the risk of explosion should the pressure in any part of the system exceed a predetermined level. Such an over-pressure valve could be provided at the top of the HP tank 4, 54a, 54b to vent excess high-pressure $CO_2$ gas from the system.

It should be noted that the various embodiments of the invention described above and shown in the accompanying drawings are examples of the invention only and various modifications and variations are intended to fall within the scope of the invention, defined by the claims hereafter. Also, any combination of non-mutually exclusive features described above is intended to fall within the scope of the invention. For example, the system shown in FIG. 4, where the HP tank 4 is filled by a siphon line 74 from the LP tank 2, could be modified to include the features of the embodiment shown in FIG. 3, so that one or more siphon lines would feed two HP tanks, one tank connected to the LP tank 2 to provide pressurised gas thereto to expel the liquefied atmospheric gas therein, and the other HP tank coupled to the RCS thrusters 32 to provide high pressure gas thereto.

A further variation of the invention not shown in the accompanying Figures but intended within the scope of the invention could be a combination of the embodiments shown in FIGS. 4 and 6, which would comprise the HP 4 tank being filled with liquefied atmospheric gas via a siphon line 74 from the LP tank 2, but the outlet duct 22 of the HP tank 4 only being connected to the LP tank 2 to provide pressurised gas thereto to expel the liquefied atmospheric gas therein, and the reaction control thrusters 32 would receive high pressure gas from the superheating unit 42 of the main thruster unit 40.

The invention claimed is:

1. A system for the recovery and management of atmospheric gas, comprising:
    a compressor configured to draw in and compress atmospheric gas at least when the system is stationary; and
    first and second storage tanks configured to store liquefied atmospheric gas from the compressor, each storage tank having an inlet duct for receiving a supply of liquefied atmospheric gas thereto, the inlet duct of the first storage tank being fluidly connected to the compressor, the second storage tank having a heater operable to heat and convert liquefied atmospheric gas therein to a high pressure gas, wherein the second storage tank includes an outlet duct fluidly coupled to the first storage tank for supplying high pressure gas to the first storage tank and, a control valve in said outlet duct, wherein the first storage tank includes an outlet duct for a flow of liquid out of the first storage tank under pressure provided by gas from the second storage tank.

2. A system according to claim 1 comprising:
    a liquefaction heat exchanger disposed downstream of the at least one compressor to liquefy compressed atmospheric gas from the at least one compressor.

3. A system according to claim 1, wherein the control valve in the outlet duct of the second storage tank comprises:
    a Joule-Thomson control valve.

4. A system according to claim 1, comprising:
    a heat exchanger in the outlet duct of the second storage tank, downstream of the control valve.

5. A system according to claim 1, wherein the heater of the second storage tank is an electrical heater.

6. A system according to claim 1, wherein the heater of the second storage tank comprises:
    a Radioisotope Heating Unit.

7. A system according to claim 1, wherein the at least one compressor includes a plurality of compressors in series configured to draw in and compress atmospheric gas.

8. A system according to claim 7, comprising:
    three compressors.

9. A system according to claim 7 wherein at least one of the compressors is a rotary compressor, and at least one of the compressors is a piston compressor.

10. A system according to claim 1, wherein the inlet ducts of the first and second storage tanks are independently controllable by respective supply valves.

11. A system according to claim 1, wherein the exit duct of the first tank comprises:
    a valve to control the flow of fluid out of the first tank.

12. A system according to claim 1, comprising:
    a third storage tank for storing liquefied atmospheric gas supplied from the at least one compressor, said third storage tank having an inlet duct for a supply of liquefied atmospheric gas thereto.

13. A system according to claim 12, wherein the third storage tank comprises:
    a heater operable to heat and convert liquefied atmospheric gas therein to a high pressure gas.

14. A system according to claim 13, wherein the inlet duct of the third storage tank is independently controllable by a supply valve.

15. A system according to claim 12, wherein the inlet duct of the second and/or third storage tank is fluidly connected to the at least one compressor.

16. A system according to claim 1, wherein the inlet duct of the second and/or a third storage tank is fluidly coupled to an outlet duct from the first storage tank via a valve for controllably filling the second and/or third storage tank from the first storage tank.

17. A system according to claim 1, wherein at least one of the storage tanks comprises:
    an overpressure valve configured to open when pressure within the tank exceeds a predetermined value.

18. A propulsion system for a flying planetary surface exploration vehicle comprising:
    a main thruster unit and a plurality of reaction control thrusters; and
    a system for recovery and management of atmospheric gas according to claim 1, wherein the outlet duct of the first storage tank is fluidly connected to the main thruster unit via a control valve to supply liquefied atmospheric gas from the first storage tank to the main thruster unit as a propellant fuel.

19. A propulsion system according to claim 18, wherein the main thruster unit comprises:
- an exhaust nozzle; and
- a superheating unit configured to convert liquefied atmospheric gas supplied thereto to a superheated gas for discharge through the exhaust nozzle as a vehicle propellant to produce lifting thrust.

20. A propulsion system according to claim 19, wherein the superheating unit comprises:
- a thermal capacitor for transfer of heat to liquefied atmospheric gas supplied thereto; and
- a heating means for heating the thermal capacitor.

21. A propulsion system according to claim 19, wherein the reaction control thrusters are fluidly connected to the main thruster unit for supplying high pressure gas to the reaction control thrusters as a propellant.

22. A propulsion system according to claim 18, wherein the reaction control thrusters are fluidly connected to the second storage tank or to a third storage tank for supplying high pressure gas to the reaction control thrusters as a propellant.

23. A propulsion system according to claim 18, wherein an outlet duct of the first storage tank is fluidly coupled to a secondary superheating unit configured to convert liquefied atmospheric gas supplied thereto from the first storage tank, to a superheated gas, the secondary superheating unit being fluidly connected to the reaction control thrusters to supply high pressure gas to the reaction control thrusters as a propellant.

24. A propulsion system according to claim 18, wherein at least one of the storage tanks comprises:
- a liquid level sensor; and
- a controller connected to said sensor, wherein the controller is configured to close the inlet supply valve of each storage tank when the liquid level sensor detects that the tank is filled to a pre-determined level with liquefied atmospheric gas.

25. A propulsion system according to claim 24, wherein the controller is configured to control the compressor to stop when a level sensor detects that the liquid level in a storage tank has reached the pre-determined level.

26. A propulsion system according to claim 22, wherein the second and/or the third storage tank comprises:
- a temperature sensor and/or a pressure sensor, and the system comprises:
- a controller connected to said sensor, wherein the controller is configured to control a heater of a respective storage tank in dependence on a sensed temperature and/or pressure detected by the sensor(s).

27. A propulsion system according to claim 18, comprising:
- one or more vehicle attitude sensors; and
- a controller, connected to each attitude sensor and to the reaction control thrusters, configured to activate one or more or the reaction control thrusters in dependence on signals provided by each attitude sensor.

28. A propulsion system according to claim 27 wherein the controller is coupled to a control valve associated with each reaction control thruster and is configured to open a respective valve to allow high pressure gas to be discharged though the respective reaction control thruster in dependence on signals provided by each attitude sensor.

29. A flight-capable vehicle for planetary surface exploration including a propulsion system according to claim 18.

30. A system according to claim 1, wherein the inlet duct of the second and/or a third storage tank is fluidly connected to the compressor.

31. A propulsion system according to claim 18, wherein the second and/or a third storage tank comprises:
- a temperature sensor and/or a pressure sensor, and the system comprises:
- a controller connected to said sensor(s), wherein the controller is configured to control a heater of a respective storage tank in dependence on a sensed temperature and/or pressure detected by the sensor(s).

* * * * *